United States Patent [19]

Thielemann et al.

[11] Patent Number: 4,542,778

[45] Date of Patent: Sep. 24, 1985

[54] TREAD FOR PNEUMATIC VEHICLE TIRES

[75] Inventors: Klaus Thielemann, Hildesheim; Hagen Trabandt, Sehnde, both of Fed. Rep. of Germany

[73] Assignee: Continental Gummi-Werke Aktiengesellschaft, Hanover, Fed. Rep. of Germany

[21] Appl. No.: 602,184

[22] Filed: Apr. 19, 1984

[30] Foreign Application Priority Data

Apr. 23, 1983 [DE] Fed. Rep. of Germany ....... 3314775

[51] Int. Cl.$^4$ ............................................. B60C 11/06
[52] U.S. Cl. ............................................. 152/209 R
[58] Field of Search ..................... 152/209 R, 209 D

[56] References Cited

U.S. PATENT DOCUMENTS

| | | | |
|---|---|---|---|
| 3,055,410 | 9/1962 | Caulkins | 152/209 R |
| 3,831,654 | 8/1974 | Boileau | 152/209 R |
| 3,847,698 | 11/1974 | Ravenhall | 152/209 R |
| 4,423,760 | 1/1984 | Treves et al. | 152/209 R |
| 4,462,446 | 7/1984 | Goergen et al. | 152/209 R |
| 4,484,610 | 11/1984 | Wallet et al. | 152/209 R |

Primary Examiner—Michael Ball
Attorney, Agent, or Firm—Becker & Becker, Inc.

[57] ABSTRACT

A pneumatic tire, the tread of which is provided with zigzagged grooves. In order to keep rocks or similar solid foreign objects from getting stuck in the tread recesses, and in order to have these rocks drop out of the tread when the associated tire axis pivots, the side faces or the zigzagged grooves are stepped. Furthermore, the step faces, which extend approximately transverse to the circumferential direction of the tire, are disposed at an incline to a plane which extends through the main axis of the tire. Side faces which merge into one another via a given step face are parallel to one another, yet are staggered relative to one another by the width of this step face. The step faces are upwardly inclined at approximately 15° to 25°.

5 Claims, 6 Drawing Figures

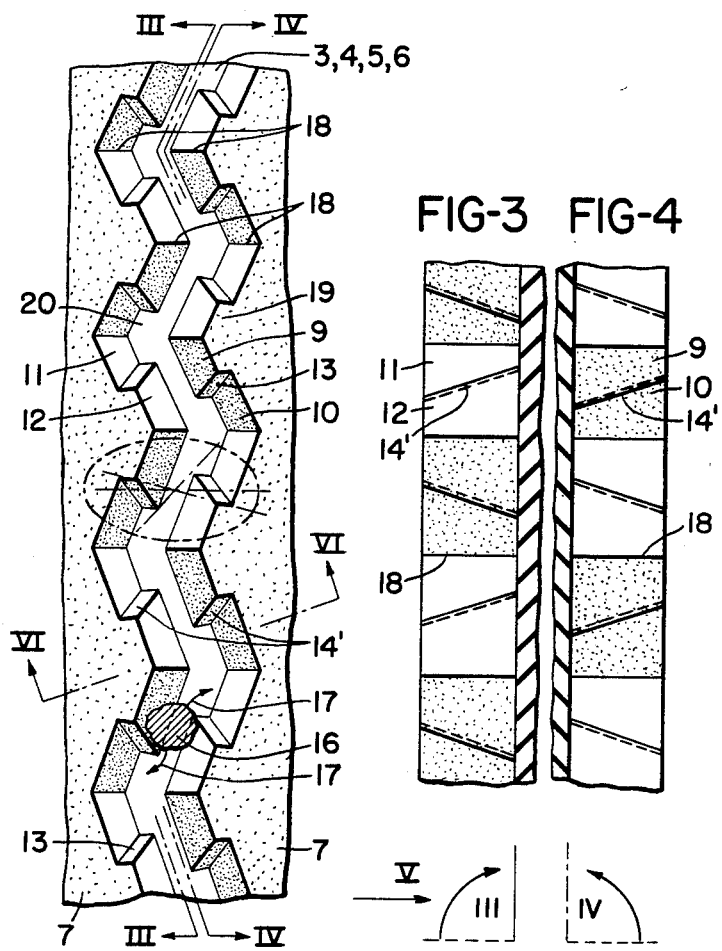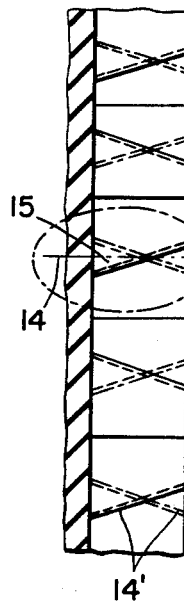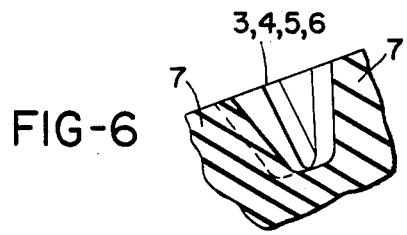

4,542,778

TREAD FOR PNEUMATIC VEHICLE TIRES

BACKGROUND OF THE INVENTION

The present invention relates to a pneumatic vehicle tire, the tread of which is provided with zigzagged grooves which essentially extend in the circumferential direction of the tire It is known, by means of a special cross-sectional configuration of the tread grooves, to alleviate the ability of foreign objects, especially rocks, to remain stuck. These measures are of particular significance for trucks, because the loads resulting therewith are so great that rocks or the like which enter the tread can lead to premature destruction in the zenith portion of the tire. Very critical in this connection are the central axles of so-called 3-axle units, for example of trailer or saddle supports. This is so because when the unit pivots or turns, these axles practically experience a pivoting right on the spot, as a result of which foreign objects which have entered can, to a certain extent, be forced into the tread.

It is an object of the present invention, with tires of the aforementioned general type, to assure that rocks or similar foreign objects which have entered the tread do not remain stuck in the profile recesses, but rather, when the associated tire axle pivots or turns, drop out of the tire tread.

BRIEF DESCRIPTION OF THE DRAWINGS

This object, and other objects and advantages of the present invention, will appear more clearly from the following specification in conjunction with the accompanying drawings, in which:

FIG. 2 shows a portion of the tread surface of FIG. 1;

FIGS. 3 and 4 are sectional views respectively taken along the arrows III—III and IV—IV, with these figures being placed directly adjacent one another;

FIG. 5 shows the illustrations of FIGS. 3 and 4 superimposed upon one another, and in particular shows the visible edges of the tread; and FIG. 6 is a sectional view taken along the line VI—VI in FIG. 2.

SUMMARY OF THE INVENTION

Figure 1:
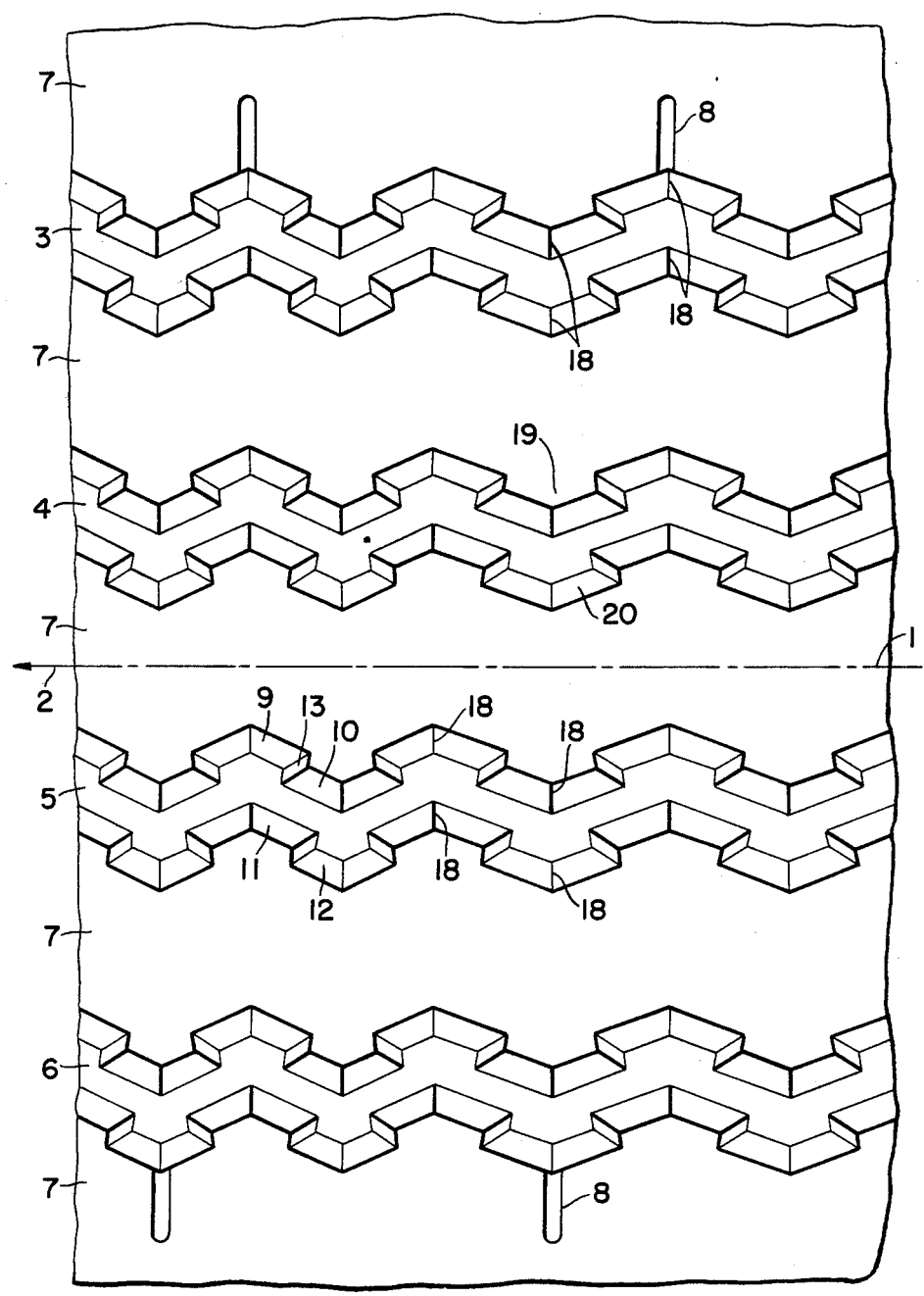
FIG. 1 is a partial plan view of one inventive embodiment of the tread surface of a pneumatic tire for trucks, and in particular of the tread surface of the tire of the central axle of a so-called 3-axle unit.

The tire tread of the present invention is characterized primarily in that the side faces which form the zigzag are stepped, and in that the step faces, which extend approximately transverse to the circumferential direction of the tire, are disposed at an incline to a radial plane which extends through the main axis of the tire. This upward slope of the step faces is preferably approximately 15° to 25°, and more preferably approximately 20°. In a given circumferential groove, opposite side faces are preferably oppositely inclined relative to the radial plane of the tire.

The side faces disposed on one side of a given circumferential groove, and merging into one another via one of said step faces, may extend parallel to one another, being staggered relative to one another by the width of the step face. If those edges of the zigzagging which extend substantially radially are aligned in the transverse direction of the tire, the stepped configuration of the side faces results on one side of the groove in projections, and results on the opposite side of the groove in recesses; these projections and recesses essentially correspond with one another, yet differ from one another with respect to the slope of their step faces.

The consequence of the inventive stepping and course of the step faces is that jammed-in foreign objects can find no appreciable support or hold; instead, when subjected to a pressure from above and a turning of the tire or a pivoting of the tire axis, pass into a region of the zigzagged groove which has a comparatively greater width. In this region, the foreign object can no longer be held by the sides of the groove. Therefore, it drops out of the tread.

DESCRIPTION OF THE PREFERRED EMBODIMENTS

Referring now to the drawings in detail, shown in FIG. 1 is one inventive embodiment of a tire tread having a center line 1, with the arrow 2 pointing in the circumferential direction of the tire. The tread essentially comprises four zigzagged, substantially circumferential grooves 3, 4, 5, and 6. These circumferential grooves divide the tread strip into five circumferential ribs 7, with those ribs 7 which are provided with the transverse slots 8 laterally terminating the tire tread surface.

One side of the tread recesses of the circumferential grooves 3 to 6 are essentially formed by the side faces 9, 10, which form the zigzag, and the other side of the circumferential grooves is essentially formed by the side faces 11, 12. The side faces 9, 10 or 11, 12 of a given side of a given one of side circumferential grooves 3 to 6 have a slight upward slope, as shown in FIG. 6; however, the side faces of a given side are not aligned with one another. Rather, between these two side faces there is provided a step or shoulder having a face 13. The step or shoulder is provided in such a way that the faces 9, 10 or 11, 12, when viewing one side of a given circumferential groove 3–6, are parallel to one another, being staggered by the width of the step face 13. These step faces 13 extend approximately in the transverse direction of the tire, yet viewed as a whole they are inclined relative to a plane 14 which extends radially with respect to the tire; this incline is at an angle of approximately 20°. Accordingly, when viewed in elevation, the faces 9, 10 or 11, 12 have a trapezoidal shape.

If the sectioning is viewed in the transverse direction, as in FIGS. 3, 4, and 5, it can be seen that the inclined edges 14' of the step or shoulder, on opposite sides of the circumferential grooves 3–6, cross one another, and in particular in such a way as to form at 15 opposed triangular surfaces.

FIG. 2 shows a foreign object, in particular a rock 16, which has entered one of the circumferential grooves. Due to the steps between the side faces 9, 10 or 11, 12, the rock 16 can be held in the region of the triangle 15. However, forces in the directions of the arrows 17 cause the rock 16 to be conducted either in one circumferential direction or in the other circumferential direction, so to speak over the associated step. The rock 16 must then pass into a groove section which has a greater width, whereupon the rock 16 then leaves the tread by falling out.

As previously noted, and as evident from FIGS. 3, 4, and 5, in the illustrated embodiment the edges 14' which face one another cross. However, this is not absolutely necessary. It is also possible to select an arrangement in which the peak of the triangular surface 15 is disposed in the tread surface itself. Moreover, the zigzag profile is such that the groove sides which are opposite the edges 18 which determine the zigzag are practically aligned with one another. The important thing under these conditions is that the aforementioned step or shoulder, which has the transversely extending yet upwardly inclined faces 13, allows projections 19 to be formed on one side of the circumferential groove, and approximately correspondingly form recesses 20 to be formed on the other side of the circumferential groove.

The present invention is, of course, in no way restricted to the specific disclosure of the specification and drawings, but also encompasses any modifications within the scope of the appended claims.

What we claim is:

1. A tread configuration, for a pneumatic vehicle tire, comprising zigzagged circumferential grooves, each of which has a base and two opposite sides; each side is stepped in such a way as to form side faces, which essentially extend in the circumferential direction of said tire, and step faces, which essentially extend transverse to the circumferential direction of said tire; said side faces of a given side of one of said circumferential grooves are grouped into pairs, with said side faces of each of said pairs merging into one another via a given one of said step faces; said step faces are disposed at an angle to a radial plane defined as extending through the main axis of said tire, such that the step faces slope upwardly toward the tread surface, each two side faces of a given pair of side faces, which merge into one another; being staggered by the width of said one step face, with the width of the latter being that dimension thereof which extends substantially transverse to the circumferential direction of said tire.

2. A tread configuration according to claim 1, in which, in a given one of said circumferential grooves, step faces which face one another in said opposite sides of said groove are disposed at oppositely inclined angles relative to said radial plane.

3. A tread configuration according to claim 1, in which said step faces are disposed at an angle of approximately 15° to 25° relative to said radial plane.

4. A tread configuration according to claim 3, in which said step faces are disposed at an angle of 20°.

5. A tread configuration according to claim 1, in which, on a given side of one of said circumferential grooves, two adjacent side faces of two adjacent pairs of side faces extend at different angles relative to the circumferential direction of said tire and merge with one another along an edge which essentially extends in the radial direction of said tire; when viewed in the transverse direction, said edges are aligned with one another in such a way that on one side of a given groove a projection is formed which extends into said groove, and on the opposite side of said groove a recess is formed which essentially conforms to said projection; the step face of a given projection, and the step face of a given oppositely located recess, are disposed at oppositely inclined angles relative to said radial plane.

* * * * *